United States Patent [19]

Ferguson et al.

[11] 4,409,626
[45] Oct. 11, 1983

[54] VIDEO DISC PLAYER HAVING VERTICAL TIMING SIGNAL GENERATOR

[75] Inventors: James M. Ferguson, Levittown, Pa.; Thomas Y. Chen, Brunswick; Walter G. Gibson, Princeton, both of N.J.

[73] Assignee: RCA Corporation, New York, N.Y.

[21] Appl. No.: 309,193

[22] Filed: Oct. 6, 1981

[51] Int. Cl.³ .................... H04N 5/76; H04N 5/04
[52] U.S. Cl. .................... 358/338; 358/336; 358/342; 358/147; 358/148
[58] Field of Search .......... 358/322, 338, 342, 340, 358/145, 147, 319, 336, 148, 155, 314, 339; 360/33.1, 36.1, 73, 70

[56] References Cited

U.S. PATENT DOCUMENTS

| | | | |
|---|---|---|---|
| 3,758,713 | 9/1973 | Sekimoto | 358/145 X |
| 3,941,920 | 3/1976 | Mohri et al. | 358/148 X |
| 3,941,930 | 3/1976 | Mohri et al. | 358/148 |
| 3,984,828 | 10/1976 | Beyers, Jr. | 340/324 AD |
| 4,122,488 | 10/1978 | Mikado | 358/19 |
| 4,123,779 | 10/1978 | Goldschmidt | 358/338 |
| 4,313,134 | 1/1982 | Rustman et al. | 358/342 |
| 4,376,956 | 3/1983 | Kelleher | 358/322 |

Primary Examiner—Aristotelis M. Psitos
Assistant Examiner—Donald McElheny, Jr.
Attorney, Agent, or Firm—E. M. Whitacre; J. S. Tripoli; R. G. Coalter

[57] ABSTRACT

A signal source continuously produces a horizontal timing signal proportional to the line rate of a recovered composite video signal. A vertical timing unit coupled to the source continuously produces a vertical timing signal proportional to the field rate of the video signal. An error detector processes data words present in the vertical interval of the composite video signal to provide a data status signal indicative of the validity of each processed data word. The data status signal is applied to the vertical timing unit for synchronizing the vertical timing signal with the vertical synchronizing component of the composite video signal and rendering the vertical timing signal substantially immune to noise which might accompany the composite video signal.

10 Claims, 6 Drawing Figures

VIDEO DISC PLAYER HAVING VERTICAL TIMING SIGNAL GENERATOR

This invention relates to video disc players and particularly to video disc players of the kind having an auxiliary source for continuously providing vertical timing signals notwithstanding partial or total interruption of video signals recovered from a record being played.

Video disc players are known in which a turntable rotates a video disc record at a predetermined constant angular velocity and a pickup transducer recovers a video output signal from the record which is then processed for application to a conventional television receiver. It is advantageous to "squelch" or "blank" the video output signal during the "pause" operating mode of the player to avoid the appearance of noise ("snow") in the displayed picture when no signal is being recovered from the record. An example of a video disc player having such a squelch feature is shown and described in U.S. Pat. No. 4,286,290 entitled "FAST RECOVERY SQUELCH CIRCUIT FOR A VIDEO DISC PLAYER" by Pyles et al. which issued Aug. 25, 1981.

In such players a loss of synchronism may occur between the player and its associated television receiver during the period that the video output signal is squelched. As a result, there may be a tendency for the displayed picture to "roll" when playback of the record is resumed until the receiver vertical oscillator resynchronizes with the vertical timing component of the player video output signal.

The problem of "picture roll" is recognized in the U.S. patent application of C. M. Wine entitled "VIDEO DISC PLAYER HAVING AUXILLIARY VERTICAL SYNCHRONIZING GENERATOR", Ser. No. 297,056 which was filed Aug. 27, 1981. Wine's solution to the problem is to add a vertical reference signal generator to the player which continuously produces a vertical reference signal equal in frequency and substantially equal in phase to the vertical timing component of the recovered composite video signal. Synchronism is maintained between the player and its associated TV receiver when the player is in the "pause" operating mode (when the video output signal is squelched) by supplying the reference signal to the receiver thereby preventing undesirable "roll" of the image produced by the receiver when the player is returned to the "play" operating mode.

In an illustrative embodiment of the reference signal generator proposed by Wine, a high frequency clock signal (a multiple of the turntable angular velocity) is applied to a divider which divides the clock signal to provide a vertical reference signal equal in frequency to the vertical timing component of the composite video signal. A consistent phase relationship between the divider output signal and the vertical timing component of the recovered composite video signal is established by means of a detector which separates the vertical timing component from the composite video signal and applies the separated vertical timing component to a synchronizing (reset) input of the divider. Once the divider is synchronized, the video signal may be squelched and the divider will continue to produce the timing reference signal in the phase it was last set to by the detected vertical timing component of the composite video signal.

It is recognized herein, that in video disc players of the general kind discussed above, the composite video signal may be subject to noise (due to disc defects, for example). The noise may cause false resetting of the divider thereby producing a momentary phase discontinuity of the vertical timing signal produced by the divider.

In a second U.S. patent application Ser. No. 306,474, of C. M. Wine entitled "VIDEO PLAYER APPARATUS HAVING CAPTION GENERATOR" filed Sept. 28, 1981, there is described a video disc player including a microprocessor which processes data accompanying the recovered video signal and controls a character generator which produces a caption video output signal for display along with the recovered composite or "picture" video signal on a television receiver. A timing signal processor detects timing components of the recovered composite video signal and supplies the detected timing components to the character generator to synchronize the caption video signal with the "picture" video signal. The processor generates and supplies "substitute" timing signals to the character generator and to the player output circuits under conditions which interrupt the timing components of the composite video signal whereby captions may be continuously displayed on the television receiver notwithstanding partial or total interruption of the composite video signal.

In an illustrative embodiment of the timing signal processor, the "substitute" vertical timing signal is produced by a counter having a full scale count of 264 which is slightly greater than the number of lines in one NTSC field (262.5 line). The counter is clocked by line frequency pulses and reset by detected vertical synchronizing pulses. Since the maximum count of the counter is greater than the number of lines in a standard field, the counter is normally reset before reaching its full count and thus produces no output pulses. If the composite video signal is interrupted, however, the counter will not be reset and will begin to produce "substitute" output pulses having substantially the same repetition rate as the missing vertical synchronizing component of the composite video signal.

It is recognized herein that timing signal processors of the second kind described above may also be subject to certain undesirable noise effects. As an example, if the recovered composite video signal includes a noise burst that is falsely detected as being a valid vertical synchronizing signal, then the vertical counter which produces the substitute vertical timing pulses may be erroneously reset. This, in turn, may cause a phase discontinuity of the substitute pulses produced by the counter or, for the case of a series of such noise bursts, may prevent the counter from producing any "substitute" timing pulses.

The present invention is directed to meeting the need for a video disc player having an auxilliary source for continuously providing a vertical timing signal notwithstanding partial or total interruption of video signals recovered from a video disc record being played and in which the probability of occurrence of a noise induced phase discontinuity of the "auxilliary" vertical timing signal is substantially reduced.

A video disc player embodying the invention includes a signal recovery means for providing a composite video output signal having a vertical timing component and in which a data word is present during a selected line of the vertical interval thereof. A first means is coupled to the recovery means for processing the data words to provide a data status signal indicative of the validity of each processed data word. A second means is coupled to the recovery means for providing a reference frequency signal proportional to the horizontal line rate of the composite video output signal. A third means is responsive to the reference frequency signal for continuously producing a vertical timing signal having a frequency proportional to the field rate of the composite video output signal. Fourth means applies the data status signal to the third means for causing the vertical timing signal produced by the third means to exhibit a predetermined timing relationship with the vertical timing component of the composite video output signal. Fifth means are provided for utilizing the vertical timing signal produced by the third means.

Figure 1:
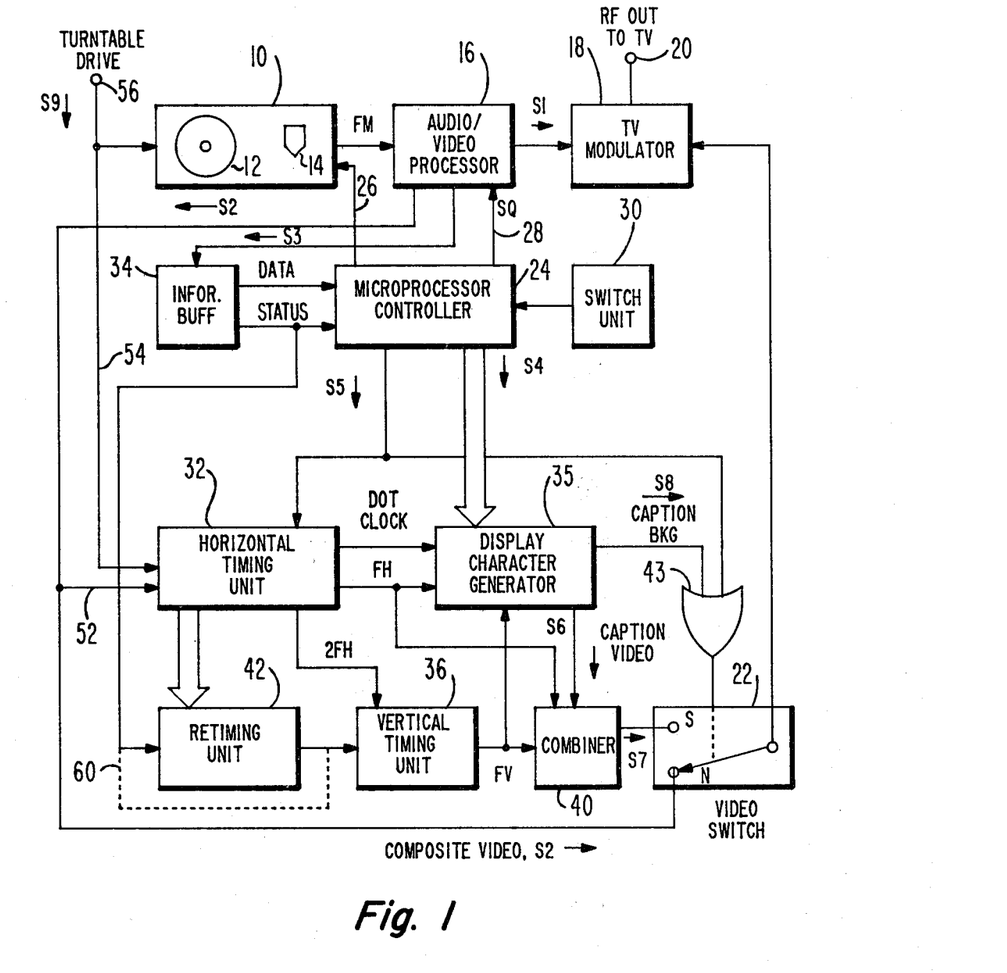
FIG. 1 is a block diagram of a video disc player embodying the invention.

The player 10 of FIG. 1 includes a turntable mechanism for rotating a video disc record 12 at a predetermined substantially constant angular velocity and a pickup transducer 14 for recovering information signals from the disc. Illustratively, it will be assumed that the player is intended for use with records in which information is stored in the form of topological variations and recovered by sensing capacitance variations between a stylus in transducer 14 and the record 12. The output of transducer 14 is applied to a capacitance-to-voltage converter in player 10 which produces an FM output signal voltage representative of the recorded information. Such records and suitable circuits for implementing capacitance-to-voltage conversion are well known. See, for example, U.S. Pat. No. 3,783,196 entitled "HIGH DENSITY CAPACITIVE INFORMATION RECORDS AND PLAYBACK APPARATUS THEREFORE" which issued to T. O. Stanley, Jan. 1, 1974; U.S. Pat. No. 3,842,194 entitled "INFORMATION RECORDS AND RECORDING/PLAYBACK SYSTEMS THEREFOR" which issued to J. K. Clemens, Oct. 15, 1974; and U.S. Pat. No. 4,080,625 entitled "PICKUP CIRCUITRY FOR A VIDEO DISC PLAYER WITH PRINTED CIRCUIT BOARD" which issued to Kawamoto et al., Mar. 21, 1978.

The FM signal is applied to an audio/video processor 16 which produces a baseband audio output signal, S1, and a baseband composite video output signal, S2, inclusive of horizontal synchronizing or "timing" pulses (HS) and vertical synchronizing or "timing" pulses (VS). Processor 16 also has an input for receiving a squelch signal (SQ) for inhibiting or muting the audio and composite video output signals when the squelch signal is present. Pyles et al., in U.S. Pat. No. 4,286,290 entitled "FAST RECOVERY SQUELCH CIRCUIT FOR A VIDEO DISC PLAYER" which issued Aug. 25, 1981, disclose a suitable implementation of processor 16 which includes timebase error correction circuitry and format conversion circuitry for converting the recovered video signal from the "buried subcarrier format" proposed by Pritchard in U.S. Pat. No. 3,872,498 to NTSC format. The advantages of buried subcarrier encoding of video disc records are well known and records recorded in such a format are commercially available, for example, from RCA Corporation. Carnt et al., in U.S. Pat. No. 4,200,881 describe processors suitable for recording and reproducing composite video signals of PAL format.

The baseband audio signal S1 produced by processor 16 is applied to the sound carrier modulation input of a TV modulator 18 which has an RF output terminal 20 for connection to the antenna input terminal of a television receiver (not shown). The composite baseband video signal S2 is coupled via a video switch 22 (when the switch is in its normal position, N, as shown) to the video modulation input terminal of modulator 18 which produces modulated picture and sound carrier waves on a selected TV channel for reception by the receiver. An integrated circuit suitable for use as modulator 18 is the type LM 1889 available, for example, from National Semiconductor, Inc.

A controller 24 (preferably microprocessor based as opposed to being implemented with random logic) provides various supervisory and information display control functions. The control functions (supplied via cable 26 to player 10 and via cable 28 to processor 16) include, illustratively, control of the radial position, elevation, velocity and direction of movement of pickup transducer 14 relative to disc 12 and squelching or muting of the audio and video signals produced by processor 16. Some of the functions are initiated manually by means of a player control switch unit 30 coupled to an input port of controller 24. Manually initiated functions include, illustratively, play, pause, slow scan forward or reverse, rapid scan forward or reverse and caption display enable. Upon closure of one of the user activated switches in unit 30, controller 24 addresses its internal read only memory (ROM) and fetches an appropriate sequence of instructions resident in the memory for effecting the desired control function. For example, in the pause or rapid scan modes, controller 24 supplies a stylus lift signal via conductor 26 to player 10 and a squelch signal to processor 16 via conductor 28. The stylus lift signal activates a stylus lifter solenoid in player 10 which lifts the stylus in transducer 14 from record 12 to avoid unnecessary wear. The squelch signal inhibits or mutes the audio and video output signals of processor 16 to prevent noise produced when the stylus is in its lifted position from reaching modulator 18.

Information display functions of controller 24 include processing of a data signal S3 recovered from disc 12 to provide a caption video output signal S4 and generation of a video blanking signal S5 for controlling the position of video switch 22 and the operating mode of a horizontal timing unit 32 as will be explained subsequently.

The signal S3 is a binary coded signal including a start code, an error check code and an information code including field and band numbers and is recorded on disc 12 in the form of pulse code modulation (PCM) of the luminance signal level during a selected line (e.g., line 17) of the vertical interval of each video field. The signal S3 is recovered from disc 12 by means of a PCM detector in processor 16 and supplied to an information buffer 34 which includes error checking circuits which determine the validity of each recovered data word. If a data word is received without error, buffer 34 supplies a data status signal to controller 24 which then processes the data word to generate the caption data signal S4.

A suitable implementation of the PCM detector in processor 16 is described in C. B. Dieterich's U.S. Pat. No. 4,275,416 entitled "PCM DETECTOR" which issued June 23, 1981. Information buffer 34 and controller 24 may be of the kind described in Dieterich's U.S. patent application, Ser. No. 084,393 now U.S. Pat. No. 4,308,557, filed Oct. 12, 1979, entitled "VIDEO DISC SYSTEM". Other U.S. patent applications relating to methods of verifying the validity of the data, data framing, data recording, calculation of playing time from received data and transducer control include: "VIDEO DISC PLAYER SYSTEM FOR CORRELATING STYLUS POSITION WITH INFORMATION PREVIOUSLY DETECTED FROM DISC", Ser. No. 084,392, U.S. Pat. No. 4,307,418, filed Oct. 12, 1979 by M. J. Mindel and J. C. Rustman; "IMPROVED DIGITAL ON VIDEO RECORDING AND PLAYBACK SYSTEM", Ser. No. 084,465 filed Oct. 12, 1979, now abandoned, by T. J. Christopher and C. B. Dieterich; "IMPROVED ERROR CODING FOR VIDEO DISC SYSTEM", Ser. No. 084,396, U.S. Pat. No. 4,309,721, filed Oct. 12, 1979 by T. J. Christopher; and "TRACK ERROR CORRECTION SYSTEM AS FOR VIDEO DISC PLAYER", Ser. No. 084,386, U.S. Pat. No. 4,313,134, filed Oct. 12, 1979 by J. C. Rustman and M. J. Mindel.

The caption display data produced by controller 24 may comprise messages such as video field or band numbers or other messages indicative of the operating status of the player and is supplied via a data bus to a display character generator 35 in response to activation of a user activated display on-off control switch in switch unit 30. Generator 35 converts the caption data signal to a caption video signal S6 of raster scan dot matrix form. The caption video signal S6 is synchronized with the composite video signal S2 by means of dot clock and line frequency (FH) signals produced by timing unit 32 and a field frequency signal (FV) produced by a vertical timing unit 36. The synchronized caption video signal S6 is then combined with the synchronizing signals FH and FV in a combiner 40 and the resultant signal S7 is applied to pole S of video switch 22.

Switch 22 is controlled by the video blanking signal S5 produced by controller 24 and by a caption background signal S8 produced by generator 35 which are logically combined in an OR gate 43. If neither signal S5 nor signal S8 is present, switch 22 will couple the composite video signal S2 to modulator 18. If either or both of signals S5 and S8 are present, switch 22 will change from its normal position N to its "substitute" position S and couple the resultant combined caption video and timing signals to modulator 18. As an illustration of the operation of switch 22, assume that the disc 12 is being played and that generator 35 has been enabled by closure of a display enable control switch in unit 30. In this case, the video blanking signal S5 will be low and switch 22 will be in its normal position coupling the composite video signal to modulator 18 until the caption display portion of the raster is reached. When that point in the vertical scan occurs, the caption background signal S8 will become active or "high" thereby causing switch 22 to selectively couple the character "dots" produced by generator 35 to modulator 18. This process repeats for each field so that the caption and the composite video signal produce an interleaved display on the screen of the receiver coupled to RF output terminal 20.

Assume now that the player is placed in a "pause" operating mode by closure of a switch in unit 30. In this mode, the composite video signal will be squelched, the stylus in transducer 14 will be lifted and the video blanking signal S5 will be "high" or "active" thereby holding switch 22 in position S. In this position, the receiver connected to terminal 20 will be maintained in synchronism by the FH and FV timing signal components of signal S7 and will continue to display a caption if generator 35 is enabled. Since the signals FV and FH are "locked" to the rotation of the record 12 and FV is synchronized by a data status code (as will be explained) the "substitute" timing signals will be maintained in phase with the timing signals recorded on disc 12 during the "pause" operating mode. Accordingly, when normal play is resumed, the timing components of the composite video signal will be in phase with FH and FV and there will be no phase discontinuity in the timing signals supplied to the receiver when switch 22 changes from position S to position N, thereby preventing any tendency for the image displayed on the receiver to "roll".

Of the two timing signals FH and FV, the latter is the more important one in maintaining synchronism between signals S7 and S2 when in the normal play operating mode and is also the more important one in preventing the "roll" problem discussed above. It has been found that some phase error may be tolerated as to the signal FH and the horizontal synchronizing component (HS) of the composite video signal. This error is not significant as long as the timing signal FH is of substantially the same frequency as the component HS (the line rate) of the recovered video signal S2. However, for purposes of the present invention, the signal FV should exhibit: (1) a frequency proportional to the vertical synchronizing component VS or field rate of the recovered video signal; (2) a predetermined timing relationship with VS; and (3) a high level of noise immunity, that is, FV should be substantially independent of any noise occurring at any time during any field of the recovered composite video signal. As will now be explained, timing units 32 and 36 in combination with information buffer 34 provide a vertical timing signal FV having these characteristics. Additional noise immunity may also be provided by a retiming unit 42 as will be explained.

In more detail, timing unit 32 is coupled to the signal recovery means (e.g., 10, 12, and 16) via two circuit paths 52 and 54. Path 52 applies the composite video signal S2 to a first input of unit 32 and path 54 applies a turntable speed indicating signal S9 to a second input of unit 32. In this example of the invention, the speed indicating signal comprises an AC turntable drive signal applied to a power input terminal 56 which receives AC power from a suitable source and is coupled to player 10 for powering a synchronous turntable drive motor which is the motive means for rotating disc 12. For DC drive motors the signal S9 may be obtained from the tachometer coupled to the motor or from another suitable speed indicating source as will be described subsequently. Unit 32 is controlled by the blanking signal S5 produced by controller 24 in such a manner that when signal S5 is present (S2 blanked, player in "pause" mode) the dot clock signal is phase locked or otherwise suitably conditioned to equal a multiple of the turntable speed indicating signal S9 but when S5 is absent (S2 unblanked, player in "play" mode) the dot clock signal is phase locked or otherwise suitably conditioned to equal a multiple of the HS component of S2. The multiples are selected such that the dot clock signal is of substantially the same frequency for either case.

The signal FH is derived from the dot clock by suitable means (such as a divider or a low frequency phase locked loop oscillator) so that regardless of the operating mode of the player, FH is always representative directly or indirectly of the HS signal component of the composite video signal S2. Accordingly, when S2 is not squelched or blanked, FH is synchronized with HS. However, when S2 is blanked, FH is synchronized with the rotation of the turntable supporting disc 12. It is preferred to derive the horizontal timing signal FH from the dot clock signal for reasons of improved stability. One may, however, phase lock the signal FH to multiples of S9 and the horizontal synchronizing component of S2 instead and derive the dot clock signal from FH or from another suitable source of oscillations. What is desirable in the present invention is that the frequency of the signal FH be proportional to that of HS for any operating mode of the player. Suitable implementations of timing unit 32 are discussed subsequently.

The vertical timing signal FV is produced in timing unit 36 by counting double line frequency timing pulses (2FH) produced by timing unit 32 (the 2FH pulses may be produced by multiplying FH or dividing the dot clock signal). The data status signal produced by information buffer 34 is used for synchronizing the counter with the occurrence of each error free data word in the vertical interval of the recovered composite video signal. The data status signal could, if desired, be applied directly to the synchronizing input of unit 36 as indicated by the dotted conductor 60 bypassing retiming unit 42. It is desirable, however, that the status signal be coupled from buffer 34 to timing unit 36 via the retiming unit 42 to avoid undesirable effects of transition noise, dropouts or other anomalies of the status signal. An example of circuitry for reducing noise in the digital status signal by retiming it is described subsequently.

Figure 2:
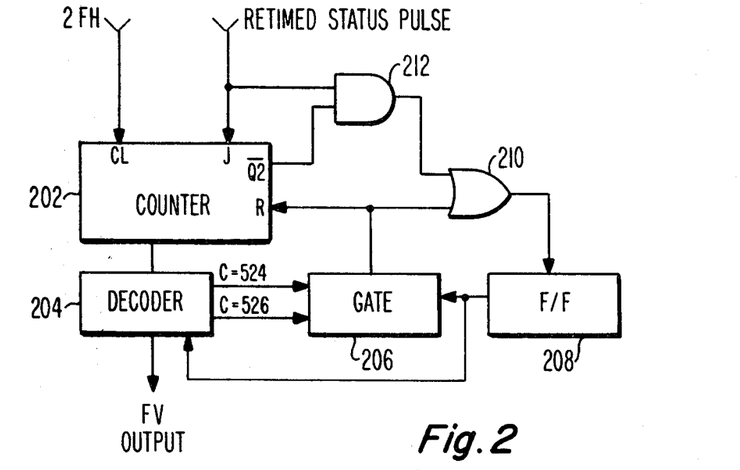
FIG. 2 is a block diagram of a vertical timing unit suitable for use in the player of FIG. 1.

FIG. 2 illustrates an implementation of vertical timing unit 36 suitable for use in NTSC standard video disc players (in which one vertical field equals 262 ½ horizontal lines) for video disc records recorded in the format proposed by Dieterich where each data word occurs on the same horizontal line (e.g., line 17) of the vertical interval for odd fields as for even fields. The principles of the invention are readily applicable, however, to other video transmission standards (e.g., the PAL 625 line standard) and to players wherein an information code with error check bits is recorded on different lines of the vertical interval from field to field.

The timing unit comprises a counter 202 having CLOCK (CL) and "jam" or "preset" input terminals to which the double line frequency pulses 2FH and the retimed status signal are applied respectively and an output coupled to a decoder 204 for providing the vertical field rate timing signal FV whenever the count in the counter equals a given value (e.g., a count of 522 for odd fields or 523 for even fields depending on the state of a flip flop 208). Two further outputs of decoder 204 representing full scale count values of 524 and 526 are coupled to a gate 206 controlled by flip flop 208 (a "toggle" flip flop) which modifies or changes the maximum or full-scale count so that the counter may assume between 524 and 526 on a field-by-field basis. The output of gate 206 is applied to the counter reset input and, via an "OR" gate 210, to the flip flop "T" or toggle input so that whenever a maximum count is reached, gate 206 resets the counter and toggles the flip flop thereby causing the counter to count alternately to 524 and 526 from field to field.

The reason for field-by-field alternation of the count is that the NTSC format, vertical synchronizing pulses are spaced 262 ½ lines apart which corresponds to 525 half lines or "counts" of the double line frequency signal 2FH signal supplied to the counter 202. On the other hand, data words which occur on the same line (e.g., line 17) of the vertical interval of both even and odd fields will be spaced 262 lines part (524 half lines or counts of the 2FH signal) from even to odd fields and 263 lines apart (526 half lines or counts of 2FH) from odd to even fields. This results because of the "half line" field to field shift of the vertical blanking signal which facilitates interlacing in the NTSC system. For this reason, flip flop 208 is toggled to cause counter 202 to count to 525 during odd or "long" fields and to 524 during even or "short" fields whereby for either field type a given count will correspond to the expected occurrence of the data status signal.

Identification of the long and short fields noted above and proper phasing of flip flop 208 is provided by AND gate 212 which has inputs coupled to the "J" (jam or preset) input and the complemented second least significant bit output ($\overline{Q2}$) of counter 202 and an output coupled via OR gate 210 to the toggle input of flip flop 208.

Operation of gate 212 is most easily understood by considering some specific examples. In each, it will be assumed that the retimed status pulse occurs during the vertical interval when the count should be 26 (binary 11010) and that the JAM input of counter 202 is set to force the count to 26 in response to the data status pulse. If the count is 26 when the status pulse arrives then no change in the count will occur. Also, since the complemented second least significant bit of the number 26 is zero, gate 212 will be disabled and the status of flip flop 208 will not change until the maximum count of 524 or 526 is reached.

Now, let it be assumed that the current field is a "long" one requiring a maximum count of 526 but for some reason, flip flop 208 is in an incorrect state (assume state "X") and causes counter 202 to be reset at a count of 524. This early resetting of the counter will cause the count to be two counts too high (28 rather than 26, binary 11100 rather than 11010) during the next field when the next status pulse arrives. Accordingly, when the next status pulse does arrive the count in counter 202 will be forced to equal 26 (the correct value) and since Q2 is zero at the moment of arrival of the pulse, gate 212 will be enabled thereby supplying one additional toggle pulse to flip flop 208. Since flip flop 208 will change states on each cycle of counter 202, the extra toggle pulse will return it to its original state corresponding to a short field count of 524 (logic "X" as assumed). In a sense this is equvalent to stopping the change of state of the flip flop for one field so that the count sequence will correspond to 524 to two consecutive fields thereby correcting the assumed error in the phase of the flip flop within a single field of the recovered composite video signal. Thereafter, flip flop 208 will resume its normal field-by-field reversal of the maximum count of counter 202.

Figure 3:
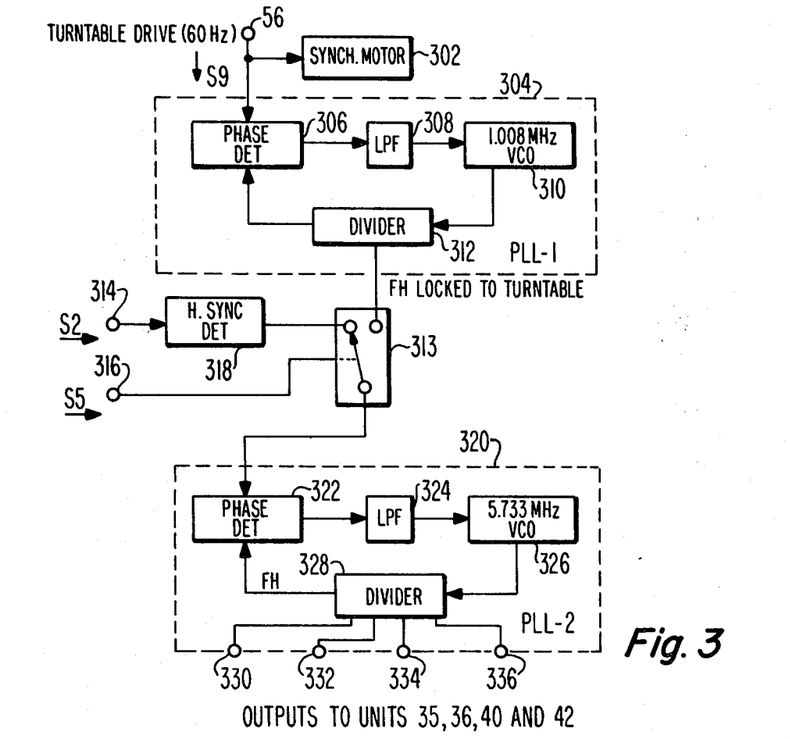
FIG. 3 is a block diagram of a horizontal timing unit suitable for use in the player of FIG. 1.

The horizontal timing unit of FIG. 3 is intended for use in video disc players having AC synchronous turntable drive motors. The unit comprises an input terminal 56 for receiving a source of AC power (e.g., 60 Hz). Terminal 56 is connected to the turntable drive motor 302 and to the phase detector 306 of a first phase lock loop (PLL-1) 304. The phase detector output is applied to a loop including a low pass filter 308, a 1.008 MHz voltage controlled oscillator 310 and a divider 312 which supplies a line rate output signal FH to a switch 313 and supplies a feedback signal (60 Hz) to lock the output signal FH to the frequency of the AC power. The composite video signal S2 and the video blanking signal S5 are applied to input terminals 314 and 316, respectively. Terminal 314 is coupled via a horizontal synchronizing signal detector 318 to switch 313 which is controlled by the blanking signal S5 to couple the output of PLL-1 to the phase detector 322 of a second phase lock loop (PLL-2) 320 when S5 is present and to couple the output of detector 318 to detector 322 when S5 is absent. PLL-2 includes a low pass filter 324, a 5.733 MHz voltage controlled oscillator 326 and a divider 328 connected in a loop to feedback a line rate signal to detector 322, thereby locking the VCO 326 to a multiple of the line rate signals selected by switch 318.

Divider 328 has a plurality of output terminals for providing output signals to units 35, 36, 40, and 42, all of which (including the dot clock) are locked to either the HS component of S2 or to the turntable speed indicating signal S9 depending on the condition of the blanking signal S5 whereby for any operating condition of the player, unit 32 provides a continuous source of line rate based timing signals. The second phase locked loop serves both as a frequency multiplier for producing the plural output signals and as a filter for suppressing switching noise of switch 313 and minimizing phase discontinuities of the timing signals supplied to units 35, 36, 40, and 42 which might occur if the output of PLL-1 is not in phase with the output of detector 318.

Figure 4:
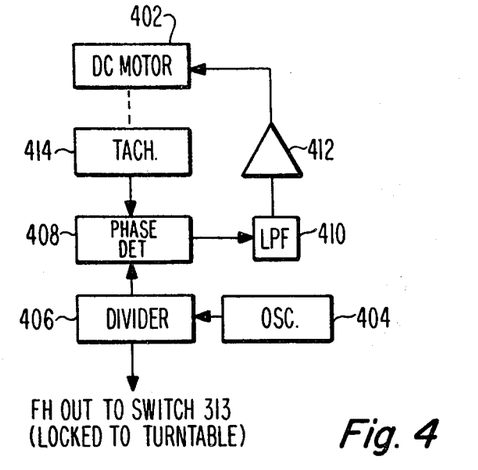
FIG. 4 is a block diagram illustrating a modification of the horizontal timing unit of FIG. 3.

In FIG. 4, the timing unit of FIG. 3 has been modified for use with a DC turntable drive motor 402. Here a fixed frequency oscillator 404 supplies a constant frequency clock signal to a divider 406 which divides the clock signal to provide a line frequency output signal to switch 313 and to a phase detector 408. The output of detector 408 is applied to motor 402 via a low pass filter 410 and a power amplifier 412 and the motor speed is sensed by a tachometer 414 and supplied to the phase detector thereby forming a phase lock loop in which the motor speed and the divided oscillator output signal are locked to a common reference frequency source (oscillator 404). Here, as in the example of FIG. 3, the turntable speed indicating signal FH is proportional to the turntable angular velocity (the motor speed).

Figure 5:
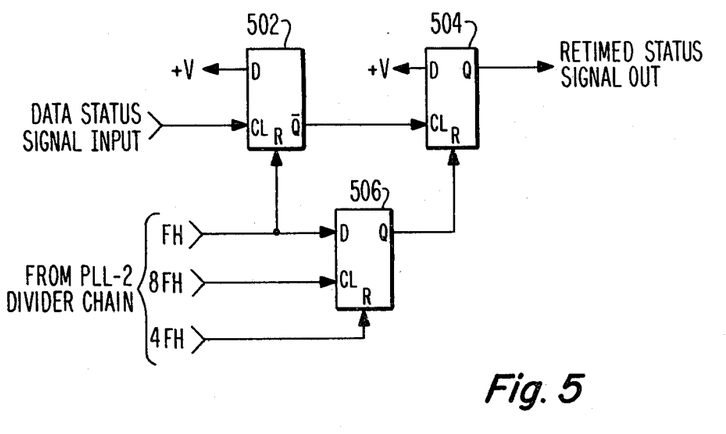
FIG. 5 is a logic diagram of a retiming unit which may be used in the player of FIG. 1.

The retiming circuit of FIG. 5 provides the function of suppressing transition noise and dropouts which might accompany the data status signal. The circuit comprises three data or "D" type flip flops 502, 504, and 506. The data inputs of flip flops 502 and 504 are each connected to a source of supply voltage +V representing a logic "1" state whereby each will assume a set condition upon a positive transition of its clock signal. Flip flop 502 is clocked by the data status pulse and flip flop 504 is clocked by the complemented output of flip flop 502. The divider chain of PLL-2 (FIG. 3) provides a 8FH, 4FH, and FH signals to the clock, reset and data inputs of flip flop 506. The reset inputs of flip flop 502 and 504 are connected, respectively to the data and true outputs of flip flop 506. The retimed status signal is obtained from the true output of flip flop 504.

Figure 6:
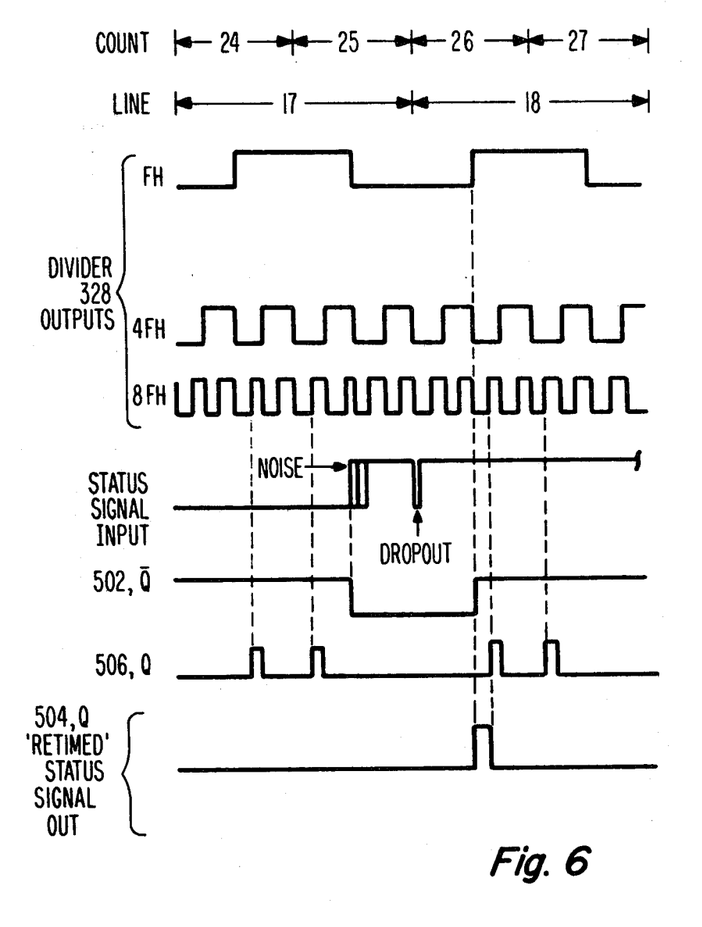
FIG. 6 is a timing diagram illustrating certain aspects of operation of the retiming unit of FIG. 5.

Operation of the retiming circuit is illustrative in FIG. 6 for the case where the status signal occurs during the second half of line 17 (when FH is low) which corresponds in FIG. 2 to a count of 25 "half lines" in counter 202. Noise is assumed to accompany the status pulse leading edge transition during count 25 and a dropout is assumed to occur at the transition between lines 17 and 18. The status pulse transition in line 17 sets flip flop 502 thereby placing the clock input of flip flop 504 at a low level. Flip flop 502 is reset by signal FH during count 26 thereby clocking flip flop 504 causing its Q output to go high during the first quarter of line 18 (the middle of count 26). Flip flop 504 is reset by flip flop 506 on the subsequent positive transition of timing signal 8FH when 4FH is low and FH is high thereby terminating the status signal. As is apparent, the retimed status signal is free of the assumed transition and dropout noise.

What is claimed is:
1. A video disc player, comprising:
   signal recovery means for providing a composite video output signal having recurring horizontal timing components and recurring vertical timing components and in which a data word is present during a horizontal line of the vertical interval thereof;
   first means coupled to said recovery means for processing said data words to provide a data status signal indicative of the validity of each processed data word;
   second means coupled to said recovery means for providing a reference signal having a frequency proportional to the horizontal line rate of said composite video output signal;
   third means responsive to said reference signal for continuously producing a vertical timing signal having a frequency proportional to the field rate of said composite video output signal;
   fourth means for applying said data status signal to said third means for causing said vertical timing signal produced by said third means to exhibit a predetermined timing relationship with said vertical timing component of said composite video output signal; and
   fifth means for utilizing said vertical timing signal.

2. A video disc player as recited in claim 1 wherein said third means comprises:
   counter means having a clock input for receiving said reference signal, output means for providing said vertical timing signal; and
   input means for receiving said data status signal and causing said counter means to assume a first count condition upon each occurrence of said data status signal.

3. A video disc player as recited in claim 2 wherein said third means further comprises:
   first logic means for causing the count in said counter means to assume a second count condition when a predetermined maximum value of count is reached; and
   second logic means responsive to said data status signal and to an output signal manifestation produced by said counter means for modifying the value of said predetermined maximum value of count on a field-by-field basis.

4. A video disc player as recited in claim 1 wherein said fourth means includes means interposed in a path between said first and third means for suppressing noise which may accompany said data status signal.

5. A video disc player as recited in claim 1 wherein said signal recovery means includes motive means for rotating a video disc record at a predetermined substantially constant angular velocity and wherein said second means comprises:
   oscillator means connected in circuit with said motive means for providing an output signal having a frequency proportional to a multiple of said angular velocity;
   detector means responsive to said composite video signal for detecting the horizontal synchronizing component thereof and providing a detected output signal;
   output terminal means;
   switch means for selectively coupling said output signals of said oscillator means and said detector means to said output terminal means; and
   phase lock loop means interposed in a path between said switch means and said output terminal means.

6. A video disc player as recited in claim 5 wherein said motive means comprises an AC synchronous motor and wherein said oscillator means comprises:
   a voltage controlled oscillator;
   divider means coupled to said voltage controlled oscillator for providing a frequency divided output signal; and
   means for phase locking said voltage controlled oscillator to a multiple of the frequency of an AC drive signal supplied to said synchronous motor.

7. A video disc player as recited in claim 5 wherein said motive means comprises a DC motor and wherein said oscillator means comprises:
   a fixed frequency oscillator;
   divider means coupled to said fixed frequency oscillator for providing a frequency divided output signal; and
   means coupled to said divider means for phase locking the rotational speed of said DC motor to a submultiple of the frequency of said fixed frequency oscillator.

8. A video disc player as recited in claim 5 further comprising:
   character generator means having a data input means for receiving caption data, output means for providing a caption video output signal in raster scan dot matrix form and a further input for receiving a high frequency dot clock signal; and
   means for deriving said dot clock signal from a voltage controlled oscillator in said phase lock loop of said second means.

9. A video disc player as recited in claim 1 wherein said fifth means comprises:
   an ouput terminal; and
   means for selectively coupling said composite video output signal and said vertical timing signal to said output terminal.

10. A video disc player as recited in claim 1 wherein said fifth means comprises:
   signal source means for providing a caption video signal and a caption background signal;
   means for applying said vertical timing signal to an input of said signal source means for synchronizing said caption video and background signals with said composite video signal;
   an output terminal and
   means responsive to said caption background signal for selectively coupling said caption video signal and said composite video signal to said output terminal.

* * * * *